United States Patent [19]

Buch

[11] Patent Number: 5,853,276
[45] Date of Patent: Dec. 29, 1998

[54] LOADING CARRIAGE

[76] Inventor: Hermann S. Buch, Merowingerstrasse 17, D-86199 Augsburg, Germany

[21] Appl. No.: 716,210

[22] PCT Filed: Mar. 16, 1995

[86] PCT No.: PCT/EP95/00979

§ 371 Date: Dec. 20, 1996

§ 102(e) Date: Dec. 20, 1996

[87] PCT Pub. No.: WO95/25055

PCT Pub. Date: Sep. 21, 1995

[30] Foreign Application Priority Data

Mar. 17, 1994 [DE] Germany .......................... 44 09 110.9

[51] Int. Cl.$^6$ ...................................................... B66F 9/00
[52] U.S. Cl. ......................... 414/255; 414/260; 414/427; 414/917
[58] Field of Search .................................. 414/259, 260, 414/917, 563, 426, 427, 428, 439, 240, 241, 253, 255; 280/402; 254/10 R, 10 B, 10 C

[56] References Cited

U.S. PATENT DOCUMENTS 3,820,667 6/1974 Critchlow et al. .

FOREIGN PATENT DOCUMENTS 1247952 8/1967 Germany .
3607910 6/1987 Germany .
3830373 3/1989 Germany .

*Primary Examiner*—Frank E. Werner
*Attorney, Agent, or Firm*—Richard C. Litman

[57] ABSTRACT

A loading carriage for transport of an object in a partially raised position, and particularly for use in a mechanical parking garage. The loading carriage includes a lifting frame movably linked to a traveling frame by lifting elements. The traveling frame has running wheels and the lifting frame is provided with mechanical grippers which are switched between an open and a closed position. The loading carriage grips the object and raises the lifting frame by a single actuating mechanism. A limit stop is installed on the lifting frame to ensure that the lifting frame is raised only after the grippers are completely closed.

4 Claims, 4 Drawing Sheets

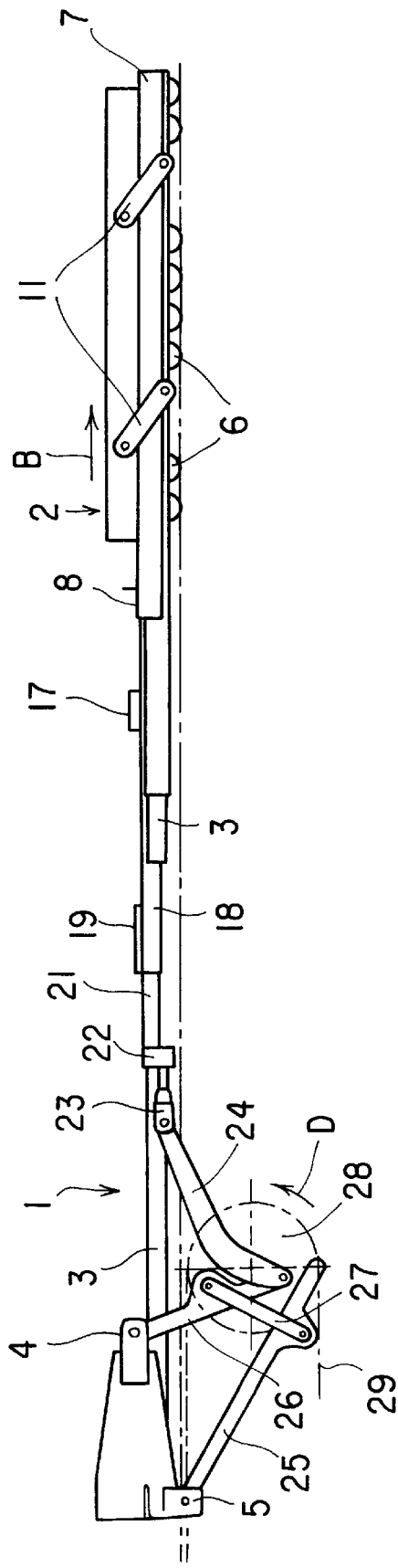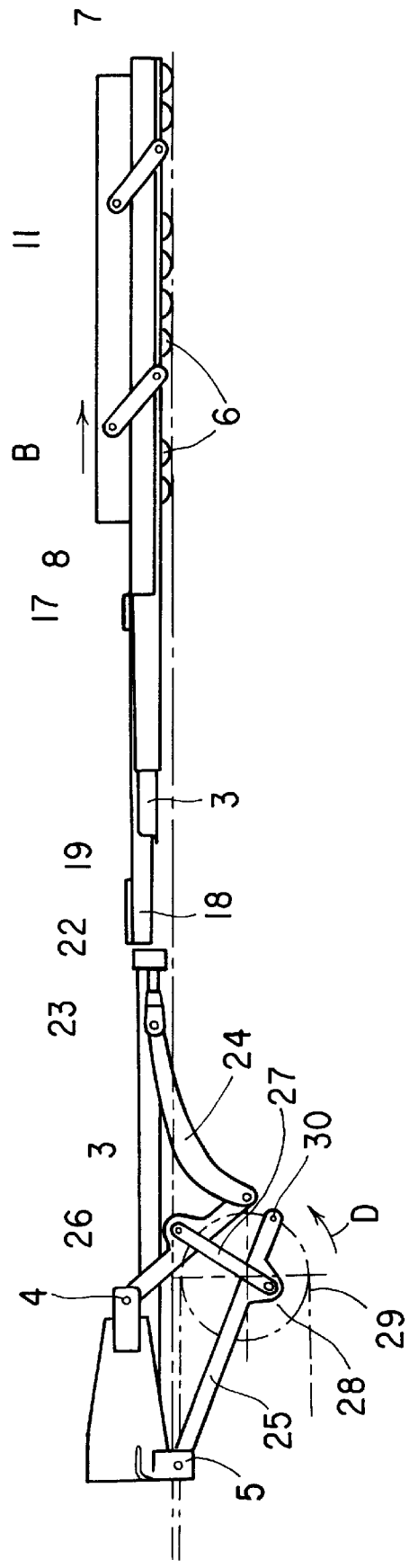

LOADING CARRIAGE

BACKGROUND OF THE INVENTION

1. Field of the Invention

The present invention concerns a loading carriage for the transport of an object in an at least partially raised position, comprising a traveling frame and a lifting frame, which is removably linked to the said traveling frame and connected thereto by means of lifting elements, whereby the traveling frame consists of several running wheels and the lifting frame is provided with at least one mechanical gripper which may be switched between an open and a closed position, whose actuating mechanism includes at least one actuating element, movable basically along the length of the loading carriage.

2. Description of the Related Art

A similar loading carriage is known from German Patent Publication 3607910. It is especially appropriate for use in a mechanical parking garage. In that connection, it is used to transport a passenger car from a drive-in box to a transport platform, whereby the front wheels of the car are gripped and raised by the gripper and the passenger car is pulled or pushed rolling on its back wheels.

In the loading carriage described in the aforementioned German Patent 3607910, the traveling frame is telescopic in construction, it consists of a front section and a rear section which moves in the longitudinal direction of the front section. The lifting frame is pivotally linked, on a horizontal axis, to the front section of the traveling frame. Between the rear section of the traveling frame and the lifting frame are connecting rods, so constructed as to raise the back portion of the lifting frame when the traveling frame is telescopically shortened. The front and rear sections of the traveling frame and the lifting frame gripper are mechanically coupled with a drive device including a chain.

The loading carriage known from the prior art exhibits a number of disadvantages. The most prominent of these is its heavy weight. Additional disadvantages are its complicated and vulnerable mechanism, this is because the working planes of the various coupling rod assemblies for the gripper and the two sections of the traveling frame penetrate each other, and the ability of the traveling frame to telescopically vary its length constitutes an additional complication of construction. Finally, in the loading carriage known from the prior art, the generally time-staggered course of gripping and raising the car cannot always be reliably assured.

SUMMARY OF THE INVENTION

The object of the present invention is to design a generic loading carriage with a simple construction, as light-weight as possible and the greatest possible degree of reliability. With regard to the latter, it is especially vital to ensure that the lifting frame begins to rise only after the gripper is completely closed.

According to the present invention, this object is achieved by making the lifting frame movable along the length—i.e. in the travel direction—of the traveling frame, by the fact that the lifting elements raise or lower the lifting frame according to the direction of its longitudinal movement relative to the traveling frame, and that a limit stop is associated with the lifting frame, against which the gripper actuating element lies when the gripper is closed. Since the frame is movable relative to the traveling frame in the direction of its length, it can be made significantly shorter and thus also lighter than the present state of the art. In addition, the movability of the lifting frame relative to the traveling frame enables also the latter to be lighter in construction than in the present state of the art, due to the requirement for the traveling frame to telescopically vary its length. In the loading carriage according to the invention, the raising and lowering of the lifting frame are achieved through its displacement in the longitudinal direction of the traveling frame, and not by the telescopic shortening or lengthening of the traveling frame—as is the case in the state of the art. Thus, given that the gripper actuating element (whose guide is preferably installed on the lifting frame), which moves along the length of the traveling frame, lies against a limit stop installed on the lifting frame, the actuation mechanism for the gripping of the object and the raising of the lifting frame is made considerably simpler and especially more reliable than the state of the art. If it is intended to grip and raise the object to be transported, once the loading carriage has been brought into position, the actuating element—which is preferably directly, but may be indirectly, driven by the lifting frame—is moved in the appropriate manner, until it comes up against the limit stop installed on the lifting frame when the gripper is closed; then, on a construction of the same motion, the lifting frame is moved relatively to the traveling frame, thus raising the lifting frame. The two individual steps—namely, the gripping of the object and the raising of the lifting frame—may be performed in a preset course through the actuation of a single actuating element. The loading carriage according to the invention is thus provided with an extraordinary simple actuation mechanism. Since it is ensured that the lifting frame is only raised when the gripper is completely closed, the loading carriage according to the invention is also superior to the state of the art with regard to safety and reliability.

In a preferred embodiment of the loading carriage according to the invention, the lifting frame is connected to the traveling frame by a pair connecting rods on opposite side of the loading carriage, each pair, in conjunction with the lifting frame and traveling frame, forming a parallelogram. In another effective embodiment of the loading carriage according to the invention, slanted guides are used as lifting elements between the lifting frame and the traveling frame.

A coupling rod assembly acting on the actuating element is provided for effective actuation of the gripper and the lifting mechanism. In an especially preferred embodiment of the loading carriage according to the invention, this assembly is linked to a coupler mechanism, which coordinates the movement of the loading carriage and the actuation of the gripper. In such a coupler mechanism, a lever is flexibly connected to the coupling rod assembly, the lever, in turn, is connected to a pusher, whose other end is flexibly fastened to the traveling frame. A shaft is furthermore flexibly connected to the traveling frame, it is linked to the pusher via a coupling rod. The distance between the connection point of the coupling rod to the shaft and the connection point of the shaft to the traveling frame is thus greater than the distance between the connection point of the coupling rod to the pusher and the connection point of the pusher to the traveling frame. In a coupler mechanism of this type, a pivot motion of the shaft in the direction of the traveling frame will result in a rapid movement of the coupling rod assembly, with the result that this rapidly closes the gripper and moves the lifting frame for raising it in respect of to the traveling frame. The shaft has a suitable linkage via a carrier to a pull chain running around two wheels, said chain belonging to a drive device for the loading carriage. As long as the carrier moves horizontally along the course of the pull chain, the entire loading carriage moves in its longitudinal direction, while, on the other hand, when the carrier runs around the deflection wheel, as described above, the gripper closes and the lifting mechanism rises, without the traveling frame being notably moved.

The above-described embodiments of the coupler mechanism is by no means the only one possible. Within the framework of the invention, many other types of drives—both coupler mechanisms and drives independent of the loading carriage movement—may be used to move the actuating element in order to actuate the gripper and to move and raise the lifting frame.

The invention is more clearly explained below, by means of the following drawings, showing in:

BRIEF DESCRIPTION OF THE DRAWINGS

FIG. 2 a side view of the loading carriage according to FIG. 1, with an open gripper and a lowered lifting frame (corresponding to the bottom half of FIG. 1).

FIG. 3 a side view of the loading carriage according to FIGS. 1 and 2, with closed gripper and lowered lifting frame (corresponding to the top half of FIG. 1).

DETAILED DESCRIPTION OF THE PREFERRED EMBODIMENT

The loading carriage consists of a traveling frame 1 and a lifting frame 2, movable (arrow A) in the direction of the traveling frame 1. The traveling frame 1 includes four longitudinal braces 3, which are connected to each other in front by means of two cross braces 4, 5.

Figure 4:
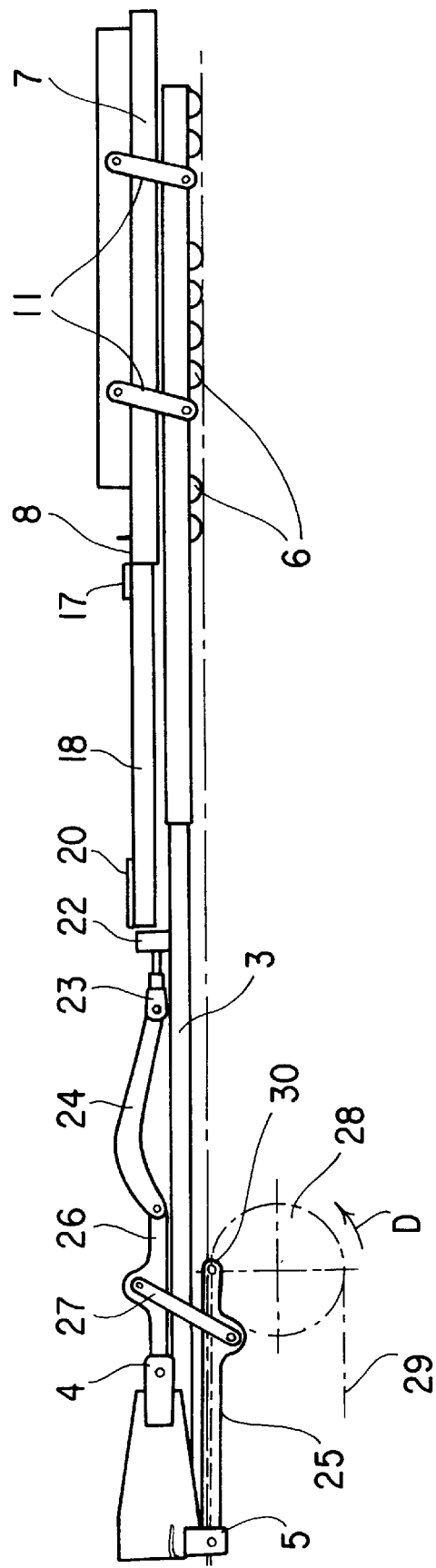
FIG. 4 a side view of the loading carriage according to FIGS. 1 to 3, with a closed gripper and a raised lifting frame.

Mounted on the underside of longitudinal braces 3 are—shown in FIGS. 2 to 4—running wheels 6; these enable the loading carriage to move in the direction of its length on the ground.

The lifting frame 2 also includes four longitudinal braces 7, each one of which is assigned to a longitudinal brace 3 of traveling frame 1. The four longitudinal braces 7 of lifting frame 2 are connected to each other in front by means of the cross brace 8. The two inner longitudinal braces 7 are also connected to each other in the rear portion of lifting frame 2 by an additional cross brace 9, each of the outer longitudinal braces 7 is connected to its adjacent inner longitudinal brace 7 by a limit stop brace 10. Each longitudinal brace 7 of the lifting frame 2 is connected to its respective longitudinal brace 3 of the traveling frame 1—as shown in FIGS. 2 to 4—by means of two connecting rods 11 in such a way that this lifting frame 2 is raised when it is moved backward (arrow B) with respect to the traveling frame 1 and in the longitudinal direction thereof.

The gripper provided on the lifting frame 2 includes two claws 12, each of which is pivotally linked, on a vertical axis, to a limit stop brace 10. Each claw 12 includes three legs, of which the limit stop leg 14 is so dimensioned that, when the gripper is closed (FIG. 1, top), each claw 12 rests on the two respective longitudinal braces 7 of the lifting frame 2. In its open position (FIG. 1, bottom), both claws 12 are so far tilted inward and forward that the space between the two neighboring longitudinal braces 7 of the lifting frame 2 is entirely open in its rear portion. When the gripper is open, the loading carriage can be pushed from the front so far under a vehicle, that its front wheels 15 are within the area of the gripper and can be gripped by it.

Figure 1:
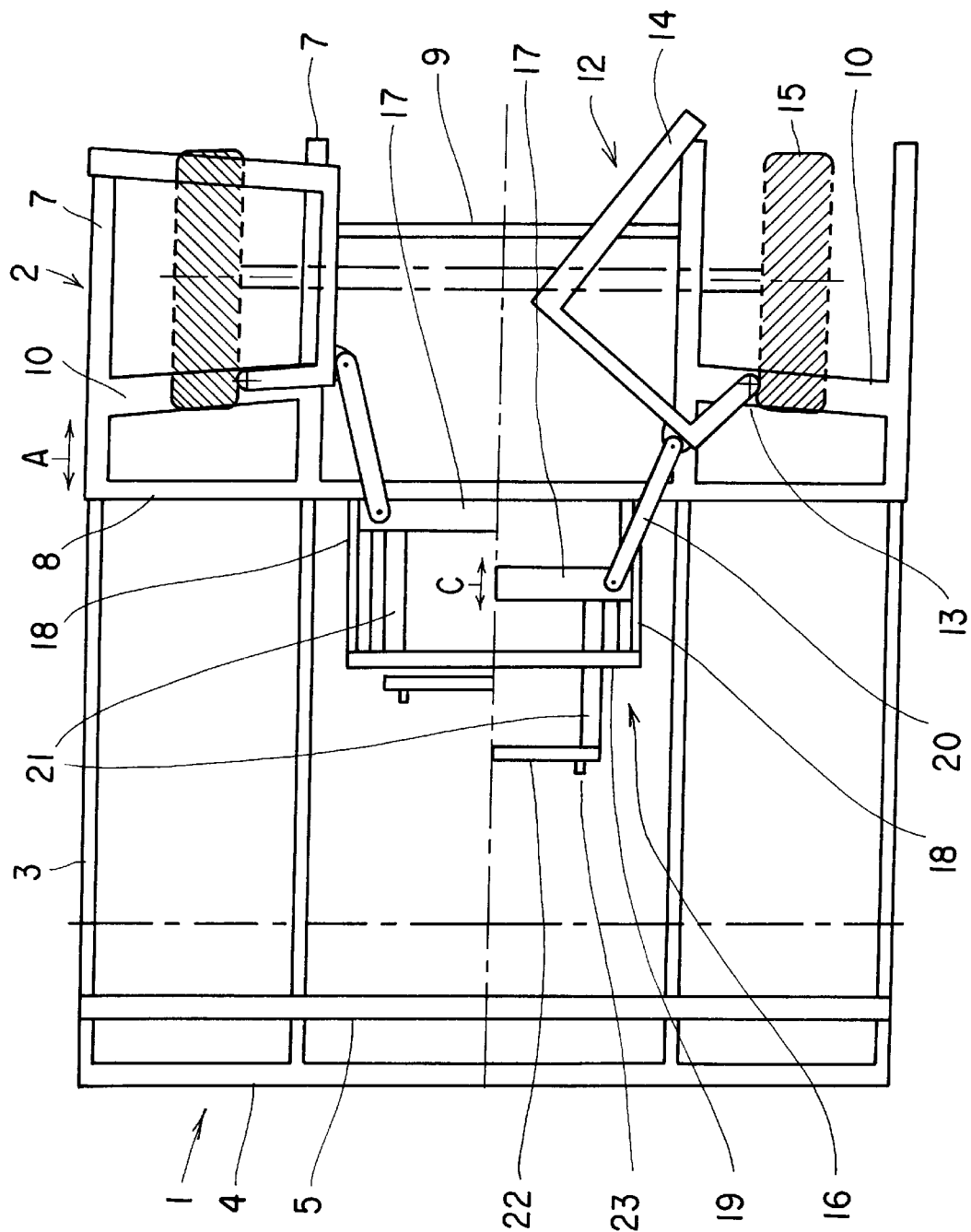
FIG. 1 a top view of a preferred embodiment of the loading carriage according to the invention, wherein the coupler mechanism is not shown, the lifting frame is lowered, and the gripper is in its open position in the bottom half of the illustration, and in its closed position in the top half of the illustration.

An actuation mechanism 16 is provided to actuate the gripper. This consists of a block 17 serving as an actuation element, this block 17 is movably guided in the longitudinal direction of the loading carriage (arrow C) by two longitudinal guides 18, firmly connected to the front cross brace 8 of lifting frame 2 and fly interconnected to each other by means of cross spar 19. Two connecting rods 20 are flexibly connected to the block. The free end of each of these connecting rods 20 is connected to the respective claw 12. This embodiment of the actuation mechanism has the result that, when block 17 is moved along longitudinal guides 18 in the longitudinal direction of the loading carriage, the claws 12 close (FIG. 1, top).

Firmly connected to the block 17 is a coupling rod assembly comprising two coupling rods 21, and a cross traverse 22 connecting them. Both coupling rods 21 are and movably guided in the longitudinal direction (arrow C). The cross traverse 22 is provided with two link eyes 24, to each of which one of the coupling mechanisms described in FIGS. 2 to 4 below is connected.

The coupling mechanisms presented in FIGS. 2 to 4 includes the lever 24, the shaft 25, the pusher 26 and a coupling connection rod 27. The shaft 25 is pivotally connected, on a horizontal axis, to the front cross brace 4 of the traveling frame 1, and the pusher 26 is slewably flexibly connected, on a horizontal axis, to rear cross brace 5 of the traveling frame 1. One end of the lever 24 is pivotally connected, on a horizontal axis running perpendicular to the longitudinal direction of the loading carriage, to pusher 26, the other end of lever 24 is connected to the link eye 23 of the cross traverse 22 of the coupling rod assembly. The pusher 26 is connected to shaft 25 by the coupling connection rod 27.

The coupling mechanism presented in FIGS. 2 to 4 is designed to work in cooperation with a loading carriage drive device with a chain 29 running around two deflection wheels 28. The shaft 25 is coupled to chain 29 by means of a carrier 30. When the deflection wheel 28 is moved counterclockwise (arrow D), as long as the carrier 30 is moved in a linear manner to the right along the lower chain strand, the loading carriage moves to the right with an open gripper. However, within the area of the deflection wheel 28, during one-half turn of the deflection wheel, the horizontal movement of the carrier is reduced to zero and accelerated in the other direction (to the left); at the same time, the carrier 30 is raised by the amount of the diameter of the deflection wheel 28. During the half-course of carrier 30 around the deflection wheel, lever 24 of the coupler mechanism according to FIGS. 2 to 4 is pivoted out of its slanted (FIG. 2) position into a nearly horizontal one (FIG. 4), in the course of which the coupling rod assembly connected to it moves to the right. The lever 24 thus moves the coupling rod assembly to the right, whereby the block 17 is moved along longitudinal guides 18 (arrow C in FIG. 1). This immediately closes the gripper by pivoting the claws 12 around the shaft 13. When the gripper is totally closed and the block 17 rests on the cross brace 8 which serves as a limit stop, the lifting frame 2 is moved relative to the traveling frame 1, and lifted by means of the connecting rods 11.

When the carrier 30, in the continued counterclockwise (arrow D) turning of the deflection wheel 28, is moved to the left along the upper strand of the chain, the loading carriage, with closed gripper and raised lifting frame, moves on the wheels 6 to the left.

Figure 5:
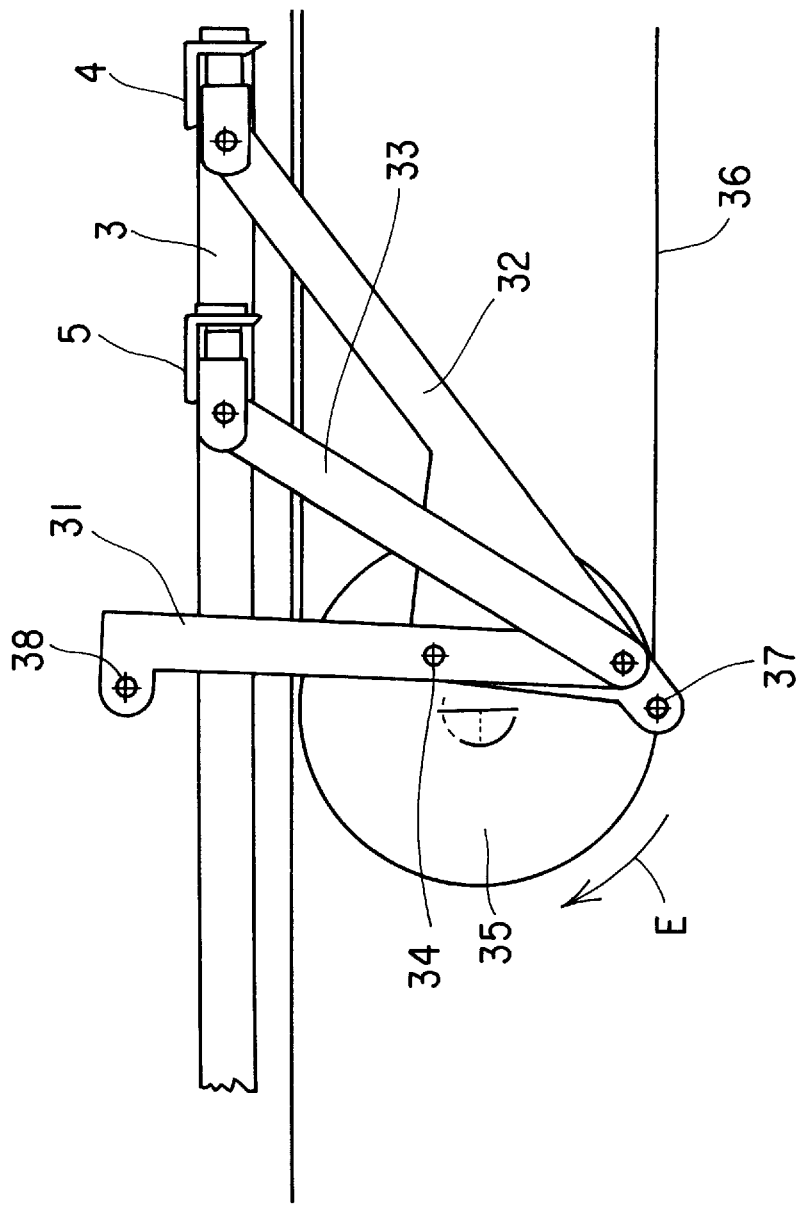
FIG. 5 depicts an alternative coupler mechanism.

The coupler mechanism shown in FIG. 5 may be used in loading carriages in which the kinematics of the lifting frame is opposite to that shown in FIGS. 1 to 4. In other words, the coupler mechanism in Fig, 5 is suitable for loading carriages in which the gripper is closed and the lifting frame raised when the actuation element is pulled forward—and not pushed backward, as in the case of the coupler mechanism explained above.

In this case, the coupler mechanism includes the lever 31, the shaft 32 and pusher 33. The shaft 32 is pivotally connected, on a horizontal axis, to the front cross brace 4, of the traveling frame 1, and the pusher 33 is pivotally connected, on a horizontal axis, to the rear cross brace 5 of the traveling frame 1. The lever 31 is pivotally connected, on a horizontal axis 34 running perpendicular to the longitudinal direction of the loading carriage, to the shaft 32. The lower end of the lever 31 is pivotally connected to the free end of the pusher 33. The coupling rod assembly is connected to the upper end of the lever 31.

The coupling mechanism presented in FIG. 5 is designed to work in cooperation with a loading carriage drive device consisting of a chain 36 running around two deflection wheels 35. The shaft 32 is coupled to the chain 36 by means of a carrier 37. When the deflection wheel 35 is moved clockwise (arrow E), as long as carrier 37 is moved in a linear manner to the left along the lower chain strand, the loading carriage moves to the left with open gripper. However, in the area of the deflection wheel 35, during one-half turn of the deflection wheel, the horizontal movement of the carrier is reduced to zero and accelerated in the other direction (to the right), at the same time, the carrier 37 is raised by the amount of the diameter of the deflection wheel 35. During the half-turn of the carrier 37 around the deflection wheel, the lever 31 of the coupler mechanism according to FIG. 5 is pivoted out of its almost vertical position into a nearly horizontal one, in which the connection point 38 of the coupling rod assembly moves to the right in an essentially horizontal manner. The lever 31 thus moves the coupling rod assembly to the right, whereby, according to what was stated above, the gripper closes and the lifting frame is raised. When the carrier 37, in the continued clockwise turning of the deflection wheel, is moved to the right along the upper strand of the chain 36, the loading carriage, with closed gripper and raised lifting frame, moves to the right.

I claim:

1. A loading carriage for the transport of an object in a partially raised position, comprising:

a traveling frame having a front portion and a rear portion, said traveling frame including at least a pair of longitudinal braces and a pair of cross braces, said pair of longitudinal braces having an underside;

a plurality of wheels mounted to the underside of said traveling frame;

a lifting frame movably mounted above said traveling frame, said lifting frame having a front and rear portion and including a pair of inner longitudinal braces connected at the rear portion by a cross brace, a pair of outer longitudinal braces, and a cross brace connecting said pair of inner and outer longitudinal braces at the front portion;

at least two pairs of substantially parallel connecting rods, each pair of connecting rods pivotally connected between one of said longitudinal braces of said traveling frame and one of said longitudinal braces of said lifting frame;

a pair of gripping members pivotally attached to said lifting frame, said gripping members being movable between an open position and a closed position; and a single actuation device for moving said pair of gripping members between the open position and the closed position and raising and lowering said lifting frame.

2. The loading carriage according to claim 1, further comprising a limit stop disposed on the lifting frame to ensure that the lifting frame is raised only after said gripping members are in the closed position.

3. The loading carriage according to claim 1, wherein said actuation device comprises:

a drive chain having a top portion and a bottom portion;

a deflection wheel engaging said drive chain;

a shaft having a first end, a second end, and a second end portion, said first end connected to said carriage, and said second end connected to said drive chain;

a coupling connection rod having a first end and a second end, said first end pivotally connected to said second end of said shaft;

a pusher having a first end, a second end, and a central section, said first end pivotally connected to said carriage, and said central section pivotally connected to said coupling connection rod's second end;

at least one lever having a first end and a second end, said first end pivotally connected to said pusher's second end;

at least one sliding block pivotally connected to said lever's second end;

a pair of longitudinal guides, each longitudinal guide having a first end and a second, end, said first ends pivotally connected to said sliding block, and said second ends pivotally connected to said gripping members.

4. The loading carriage according to claim 1, wherein said actuation device comprises:

a drive chain having a top portion and a bottom portion;

a deflection wheel engaging said drive chain;

a shaft having a first end, a second end, and a second end portion, said first end pivotally connected to said carriage, said second end pivotally connected to a carrier attached to said drive chain;

a pusher having a first end and a second end, said first end pivotally connected to said loading carriage;

a lever having a first end, a second end, and a central section, said first end pivotally connected to said pusher's second end, said central section pivotally connected to said shaft's second end portion, and said lever's second end connected to said actuation means for said gripping member.

* * * * *